United States Patent
Slayne

(10) Patent No.: US 9,505,091 B2
(45) Date of Patent: Nov. 29, 2016

(54) TOLERANCE RING AND ASSEMBLY WITH DEFORMABLE PROJECTIONS

(71) Applicant: Andrew Robert Slayne, Frampton Cotterell (GB)

(72) Inventor: Andrew Robert Slayne, Frampton Cotterell (GB)

(73) Assignee: SAINT-GOBAIN PERFORMANCE PLASTICS RENCOL LIMITED (GB)

( * ) Notice: Subject to any disclaimer, the term of this patent is extended or adjusted under 35 U.S.C. 154(b) by 593 days.

(21) Appl. No.: 13/925,731

(22) Filed: Jun. 24, 2013

(65) Prior Publication Data

US 2013/0276289 A1    Oct. 24, 2013

Related U.S. Application Data

(62) Division of application No. 12/465,097, filed on May 13, 2009, now Pat. No. 8,485,752.

(60) Provisional application No. 61/053,106, filed on May 14, 2008.

(51) Int. Cl.
| | |
|---|---|
| B23P 11/00 | (2006.01) |
| F16C 23/04 | (2006.01) |
| F16C 25/04 | (2006.01) |

(52) U.S. Cl.
CPC ............... B23P 11/00 (2013.01); F16C 23/04 (2013.01); F16C 25/04 (2013.01); *F16C 2370/12* (2013.01); *Y10T 29/49826* (2015.01); *Y10T 403/7052* (2015.01); *Y10T 403/7061* (2015.01)

(58) Field of Classification Search
CPC ........ B23P 11/00; F16C 25/04; F16C 23/04; F16C 2370/12; Y10T 403/7061; Y10T 403/7052

See application file for complete search history.

(56) References Cited

U.S. PATENT DOCUMENTS

| | | |
|---|---|---|
| 1,936,213 A | 11/1933 | Snedden |
| 3,142,887 A | 8/1964 | Hulck et al. |

(Continued)

FOREIGN PATENT DOCUMENTS

| | | |
|---|---|---|
| CN | 1774580 A | 5/2006 |
| CN | 101122304 A | 2/2008 |

(Continued)

OTHER PUBLICATIONS

International Search Report from PCT App No. PCT/IB2009/005586 dated Dec. 22, 2009, 1 pg.

*Primary Examiner* — Jacob Cigna
*Assistant Examiner* — Lee A Holly
(74) *Attorney, Agent, or Firm* — Abel Law Group, LLP; Chi Suk Kim

(57) ABSTRACT

A method of assembling a tolerance ring between opposing surfaces of an inner and outer component arranged to mate with one another to provide an interference fit therebetween includes mounting the tolerance ring on one of the inner and outer components whereby the projections are received in a recessed portion on that component, partially mating the inner and outer components, and completing mating by causing relative movement between the tolerance ring and the recessed portion to move the projections from the recessed portion and to be compressed between the mated inner and outer components. The tolerance ring includes an annular band of resilient material for engaging an opposing surface of one of the inner and outer components. The annular band has a plurality of deformable projections extending radially therefrom to engage the opposing surface of the other one of the inner and outer components.

20 Claims, 2 Drawing Sheets

(56) References Cited

U.S. PATENT DOCUMENTS

| | | | |
|---|---|---|---|
| 3,700,271 A | 10/1972 | Blaurock et al. | |
| 3,838,928 A | 10/1974 | Blaurock et al. | |
| 3,962,843 A | 6/1976 | King, Jr. | |
| 4,286,894 A | 9/1981 | Rongley | |
| 4,790,683 A | 12/1988 | Cramer et al. | |
| 4,828,423 A * | 5/1989 | Cramer, Jr. | F16D 1/0835 403/326 |
| 4,981,390 A | 1/1991 | Cramer et al. | |
| 5,607,023 A | 3/1997 | Palm | |
| 6,018,441 A | 1/2000 | Wu et al. | |
| 6,288,878 B1 | 9/2001 | Misso et al. | |
| 6,333,839 B1 | 12/2001 | Misso et al. | |
| 6,480,363 B1 | 11/2002 | Prater | |
| 6,606,224 B2 | 8/2003 | Macpherson et al. | |
| 7,554,771 B2 | 6/2009 | Hanrahan et al. | |
| 7,580,225 B2 | 8/2009 | Hanrahan et al. | |
| 7,611,303 B2 | 11/2009 | Hanrahan et al. | |
| 7,658,677 B2 | 2/2010 | Needes et al. | |
| 7,850,389 B2 | 12/2010 | Hanrahan et al. | |
| 7,913,835 B2 | 3/2011 | Gautier et al. | |
| 7,922,418 B2 | 4/2011 | Baker et al. | |
| 8,424,184 B2 | 4/2013 | Hughes | |
| 2003/0053260 A1 | 3/2003 | Barina et al. | |
| 2006/0046858 A1 | 3/2006 | Brissette | |
| 2006/0181811 A1* | 8/2006 | Hanrahan | F16C 27/00 360/265.2 |
| 2006/0228174 A1 | 10/2006 | Woodhead et al. | |
| 2006/0275076 A1 | 12/2006 | Hanrahan et al. | |
| 2006/0276246 A1 | 12/2006 | Needes et al. | |
| 2008/0043375 A1 | 2/2008 | Hanrahan et al. | |
| 2008/0199254 A1 | 8/2008 | Baker et al. | |
| 2008/0266717 A1 | 10/2008 | Court et al. | |
| 2008/0267693 A1 | 10/2008 | Court et al. | |
| 2010/0003076 A1 | 1/2010 | Slayne | |
| 2010/0321832 A1 | 12/2010 | Woodhead et al. | |
| 2010/0321833 A1 | 12/2010 | Woodhead et al. | |
| 2011/0076096 A1 | 3/2011 | Slayne et al. | |
| 2011/0271512 A1 | 11/2011 | Hughes | |

FOREIGN PATENT DOCUMENTS

| | | |
|---|---|---|
| DE | 3248148 A1 | 7/1984 |
| EP | 1 693 635 A1 | 8/2006 |
| EP | 1 731 783 A2 | 12/2006 |
| EP | 1 886 895 A1 | 2/2008 |
| JP | 2002-130310 A | 5/2002 |
| WO | 94/29609 A1 | 12/1994 |
| WO | 2004094852 A1 | 11/2004 |

* cited by examiner

TOLERANCE RING AND ASSEMBLY WITH DEFORMABLE PROJECTIONS

CROSS-REFERENCE TO RELATED APPLICATION(S)

The present application is a divisional of and claims priority to U.S. Non-provisional patent application Ser. No. 12/465,097, filed May 13, 2009, entitled "TOLERANCE RING AND ASSEMBLY WITH DEFORMABLE PROJECTIONS," naming inventor Andrew Robert Slayne, which application claims priority from U.S. Provisional Patent Application No. 61/053,106, filed May 14, 2008, entitled "ASSEMBLY METHOD AND APPARATUS," naming inventor Andrew Robert Slayne, of which both applications are incorporated by reference herein in their entirety.

FIELD OF THE DISCLOSURE

This disclosure relates to apparatus comprising mating inner and outer components, which are mounted together using a tolerance ring. For example, the apparatus can be used for mounting an arm on a bearing to form a pivot.

BACKGROUND

A tolerance ring can be used to connect together mating inner and outer components. For example, a tolerance ring may be sandwiched between a shaft that is located in a corresponding bore formed in a housing, or it may act as a force limiter to permit torque to be transmitted between the shaft and the housing. The use of a tolerance ring can accommodate minor variations in the diameter of the inner and outer components without substantially affecting their interconnection.

Typically, a tolerance ring comprises a band of resilient material, e.g. a metal such as spring steel, the ends of which are brought towards one another to form a ring. A strip of projections can extend radially from the ring either outwardly or inwardly towards the center of the ring. The projections can be formations, possibly regular formations, such as corrugations, ridges, waves or fingers. The band can include an unformed region from which the projections extend, e.g. in a radial direction.

In use, the tolerance ring can be located between the components, e.g. in the annular space between the shaft and bore in the housing, such that the projections are compressed between the inner and outer components. Each projection can act as a spring and exerts a radial force against the components, thereby providing an interference fit between them. Rotation of the inner or outer component can produce similar rotation in the other component as torque is transmitted by the ring. Likewise, linear movement of either component can produce similar linear movement in the outer component as linear force is transmitted by the ring.

If forces (rotational or linear) are applied to one or both of the inner and outer components such that the resultant force between the components is above a threshold value, the inner and outer components can move relative to one another, i.e. the tolerance ring can permit them to slip.

Although tolerance rings usually comprise a strip of resilient material that is curved to allow the easy formation of a ring, e.g. by overlapping the ends of the strip, they may also be manufactured as an annular band.

During assembly of apparatus with an interference fit between components, a tolerance ring can typically be held stationary with respect to a first (inner or outer) component whilst a second component is moved into mating engagement with the first component, thereby contacting and compressing the projections of the tolerance ring to provide the interference fit. The amount of force required to assemble the apparatus may depend on the stiffness of the projections and the degree of compression required. Likewise, the load transmitted by the tolerance ring in its final position and hence the amount of retention force provided or torque that can be transmitted may also depend on the size of the compression force and the stiffness and/or configuration of the projections.

One example of the use of a tolerance ring is in a hard disk drive (HDD) pivot mount, where the tolerance ring can provide axial retention between a rotatable pivot shaft and an arm mounted thereon. In conventional pivot mounts, the tolerance ring can provide an interference fit between the arm and a bearing mounted on the shaft.

Problems can occur during assembly of parts that use tolerance rings. As the tolerance ring requires a tight fit between its adjacent parts, there may be abrasion between the ring and various parts of the apparatus, which removes small fragments from the surface of the affected parts. These fragments are known in the art as particles. In particular, parts of the projections distal to the band of the ring may generate particles when sliding relative to part(s) of the apparatus which they contact during assembly. In certain apparatus, such as a computer hard disk drive where cleanliness is essential, production of particles is extremely undesirable, as the particles can adversely affect the function of the apparatus.

SUMMARY

In an embodiment, particle generation can be minimized by reducing the amount of sliding contact that occurs during assembly of a tolerance ring between components of an apparatus. One of the components can include a recessed portion. A tolerance ring may be mounted on that component in a pre-assembly configuration in which the recessed portion receives projections of the tolerance ring. In the pre-assembly configuration, the tolerance ring can occupy a relaxed state in which it may be positioned with respect to other components substantially without compression of the projections. This configuration can permit components of the apparatus to be moved closer to their final assembled positions before any relative sliding (and therefore particle generation) occurs. To complete assembly, the tolerance ring can be transferred from the relaxed state into an operative (i.e. compressed) state by moving relative to the component so that the projections leave the recessed portion. Sliding contact may occur during this stage, but the amount of sliding may be limited by locating the recessed portion close to the final assembled position of the projections, thereby reducing particle generation.

According to an aspect, there may be provided a method of assembling a tolerance ring between opposing surfaces of an inner component and an outer component to provide an interference fit therebetween. The inner and outer components can be arranged to mate with one another, and the tolerance ring can include an annular band of resilient material for engaging an opposing surface of one of the inner and outer components. The annular band can have a plurality of deformable projections extending radially therefrom to engage the opposing surface of the other one of the inner and outer components. The method can include mounting the tolerance ring on one of the inner and outer components whereby the projections are received in a recessed portion on that component, partially mating the inner and outer components, and completing mating by causing relative movement between the tolerance ring and the recessed portion to cause the projections to leave the recessed portion and to be compressed between the mated inner and outer components. The partial mating of the inner and outer components can include moving the tolerance ring into its in use portion relative to the component without the recessed portion and the completion of mating can include moving the component with the recessed portion relative to the tolerance ring.

As explained above, when the tolerance ring is mounted with its projections received in the recessed portion, it may occupy a relaxed state in which mating of the inner and outer components may take place without compression of the projections. The pressure on the opposing surfaces caused by compressed projections during axial sliding of components can be a primary cause of particle generation in conventional tolerance ring assembly methods. When the tolerance ring is in the relaxed state there may be substantially no compression of the projections and hence less pressure on the opposing surfaces during mating. Thus, by having the tolerance ring in a relaxed state for part of the axial sliding operation (the partial mating step) the length of slide with compressed waves is reduced. Particle generation may thus be reduced compared with conventional assembly methods. The completion of mating (i.e. relative movement between the tolerance ring and recessed portion) can transfer the tolerance ring into its operative state. It may be achieved by pushing the tolerance ring relative to the recessed portion or by pushing the component with the recessed portion relative to the tolerance ring. In one embodiment the partial mating step may include inserting the tolerance ring to its "in use" position relative to the component without the recessed portion while in its relaxed state. The subsequent relative movement may include bringing the inner and outer components into their "in use" positions while retaining the position of the tolerance ring.

In one embodiment the recessed portion may be on the outward facing surface of the inner component. The rest diameter of the tolerance ring may be smaller than the diameter of the recessed portion so that the natural resilience of the tolerance ring can cause it to grip the inner component when mounted in its relaxed state. When the tolerance ring is moved to its operative state (i.e. between the components but with the projections outside the recessed portion) its diameter may be greater than the diameter in the relaxed state, whereby compression of the projections occurs. The diameter of the tolerance ring in the relaxed state may be chosen to permit the combination (i.e. pre-assembly) of the tolerance ring and inner component to mate with the outer component without compression of the projections.

The axial length of the inner component may be similar to the axial length of the tolerance ring. In such an arrangement the tolerance ring may protrude axially from the inner component when mounted in its relaxed state. In this case the projections on the tolerance ring may be either received in the recessed portion on the outward facing surface of the inner component or located outside of the inner component. Moving the tolerance ring into the operative state may include axial movement (achieved e.g. by a mechanical press) of the tolerance ring with respect to the inner component to push it into alignment therewith.

In an alternative embodiment the recessed portion may be on the inward facing surface of the outer component. In such an embodiment the annular band of the tolerance ring may have an open configuration with a rest diameter greater than the diameter of the recessed portion such that the resilience of the tolerance ring can enable it to be retained when mounted on the outer component in its relaxed state.

In another aspect, the invention may provide a mounting assembly comprising an outer component, an inner component arranged to mate with the outer component, and a tolerance ring located between opposing surfaces of the inner and outer components to provide an interference fit therebetween. The tolerance ring can include an annular band of resilient material for mounting on the opposing surface of one of the inner and outer components. The annular band can have a plurality of deformable projections extending radially therefrom to engage the opposing surface of the other one of the inner and outer components. One of the opposing surfaces can include a recessed portion for receiving the projections during mating of the inner and outer components.

One of the opposing surfaces may thus comprise a recessed portion having a first diameter and a mounting portion having a second diameter that is different from the first diameter. The recessed portion may be located between two mounting portions. The tolerance ring may occupy a relaxed state when the projections are received in the recessed portion and an operative state when the projections are aligned with the mounting portion. In other words, the tolerance ring can be closer to its rest configuration when in the relaxed state than in the operative state.

In another aspect, the recessed portion may be on the inner component, whereby the inner component may resemble a bobbin, i.e. two axially spaced circumferential collars bounding a circumferential channel. The projections may all extend radially inwardly from the band so that they are directly receivable in the recessed portion. In an embodiment, a mounting assembly can include an outer component, an inner component arranged to mate with the outer component, and a tolerance ring located between opposing surfaces of the inner and outer components to provide an interference fit therebetween. The tolerance ring can include an annular band of resilient material for mounting on an inward facing surface of the outer component. The annular band can have a plurality of deformable projections extending radially inward therefrom to engage the outward facing surface of the inner component, wherein the outward facing surface of the inner component can have a recessed portion for receiving the projections during mating of the inner and outer components.

The outward facing surface of the inner component may have a mounting portion with a greater diameter than the recessed portion. The tolerance ring can be movable axially relative to the inner component to transfer the projections from the recessed portion to the mounting portion. The mounting portion may be adjacent to the recessed portion so that the amount of axial movement required is small.

In another embodiment, the projections may all extend radially outwardly from the band. In this case, the band can be arranged to be mounted on the outward facing surface of the inner component and the projections can be configured to engage the inward facing surface of the outer component. In this arrangement the band may be have a varying diameter such that the projections are located on a narrowed "waist" of the band which is receivable in the recessed portion of the outward facing surface on the inner component. In the operative state, a mounting portion on the outward facing surface of the inner component may push out the waist of the band whereby the projections are compressed against the inward facing surface of the outer component.

In a further embodiment, the tolerance ring can have two axially spaced sets of circumferentially spaced projections. The recessed portion can be arranged to receive one set of projections. The other set of projections can lie outside the component when the tolerance ring is mounted on a component in the relaxed state, i.e. during mating of the components the tolerance ring can protrude axially from one of the components.

The inner and outer components can include a shaft that is receivable in a bore formed in a housing. The bore can extend fully through the housing or only extend partially through or into the housing. In one embodiment, the housing can be an arm for a hard disk drive and the shaft may be a pivot for that arm. The shaft can include a bearing, e.g. a pair of axially spaced bearings located on a central shaft. The bearings can be housed in a sleeve; the recessed portion may be provided in the sleeve. Alternatively, in a sleeveless configuration, the recessed portion can be provided in a spacer element which separates the outer races of the pair of bearings.

A yet further aspect of the invention can include a pre-assembly comprising the tolerance ring mounted in the relaxed state on one of the components before mating with the other component.

The tolerance ring can be an open or closed loop of resilient material, i.e. it can extend entirely or partly around the perimeter of the shaft. The projections can be arranged such that there are diametrically opposing pairs of projections around the circumference when the tolerance ring occupies its operative state. Each projection can comprise a rounded ridge rising to and falling from a radial peak. There can be an equal distance between the longitudinal axis of the bore of the housing (i.e. outer component) and the peak of each of the projections. In this case, the peak radius can be measured from the longitudinal axis to the peak of any one of the projections.

In small component environments, e.g. hard disk drive mounts, compression of the projections when the tolerance ring is transferred into its operative state can cause the radial extent of the projections to change by 0.2 mm or less. Accordingly, the recessed portion may require a depth of around 0.2 mm, e.g. from 0.2 mm to 0.3 mm, to enable the tolerance ring diameter in the relaxed state to differ enough from its diameter in the operative state to avoid compression during mating. Generally, the depth of the recessed portion can be between about 90% to about 150% of the change in the radial extent of the projections, such as less than about 135% of the change, even less than about 110% of the change.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1A:
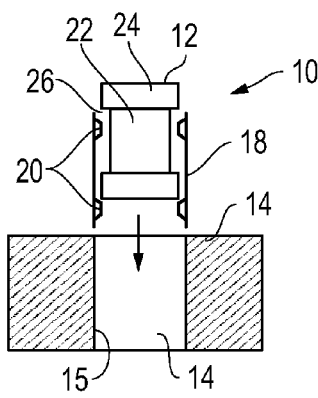
FIGS. 1A, 1B, and 1C are cross-sectional views of a tolerance ring assembly at three stages during a mounting method that is an embodiment of the invention.
Figure 1B:
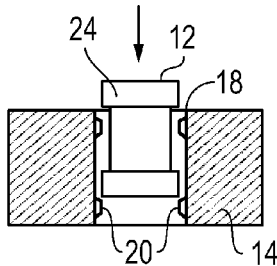
Figure 1C:
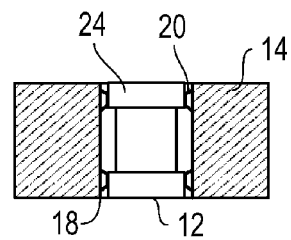

FIGS. 1A, 1B and 1C show steps of an exemplary assembly method and an exemplary mounting apparatus 10 that are embodiments of the invention. The apparatus 10 can include an inner component 12, which in this embodiment is a shaft, e.g. a sleeved or sleeveless pivot. The inner component 12 can be receivable into a bore 16 formed in an outer component 14, which may be a housing e.g. an arm of a hard disk drive. The inner and outer components 12, 14 can mate with each other through insertion of the shaft into the bore 16.

A tolerance ring 18 can be provided to fit the inner and outer component 12, 14 together and compensate for variations in the manufacturing process of those components which cause variations in their dimensions. The tolerance ring 18 can have a conventional configuration, e.g. comprise a resilient annular band made e.g. from spring steel with projections (or "waves") 20 extends radially therefrom. The waves can be press-formed into a flat strip, which is subsequently formed into the curved band. All of the projections 20 can extend in the same direction, which in this embodiment is radially inwardly from the band. In this embodiment there can be two sets of circumferentially spaced projections which are axially spaced from each other on the band. The projections in each set can be aligned with each other.

The inner component 12 can resemble a bobbin. It can have a central circumferentially extending recessed portion 22 bounded at each axial end by a mounting portion 24. The diameter of each mounting portion 24 can be greater than the diameter of the recessed portion 22 such that there is a circumferential channel 26 around the inner component 12.

A method of assembling is illustrated in FIG. 1A through 1C. Here the tolerance ring 18 can be mounted on the inner component 12 in an axially offset manner such that one set of projections 20 is received in the channel 26 and the other set lies outside the inner component. The radial peaks of all the projections therefore lie on a smaller diameter than the outer diameter of the mounting portions 24. This means that the outer diameter of the tolerance ring can be smaller than it would be if the uncompressed projections 20 engaged the mounting portions. In other words, the projections 20 can overlap with the radial protrusion of the mounting portions 24 from the channel 26.

The combination of the tolerance ring 18 and inner component 12 mounted together in this way may be referred to as a pre-assembly. In FIG. 1A the pre-assembly can be inserted axially into the bore 16 in the outer component 14. The diameter of the recessed portion 22 can be chosen such that the outer diameter of the pre-assembly (i.e. the outer diameter of the tolerance ring in this embodiment) is no greater than the diameter of the bore (i.e. defined by an inward facing surface 15 of the outer component 14). Insertion of the pre-assembly may thus take place without compression of the projections 20 between the inner and outer components. Insertion can include mating of the inner and outer components.

FIG. 1B shows the completed insertion step. In this embodiment the inner component 12, the outer component 14 and the tolerance ring 18 can all have similar axial length so that they are substantially aligned in use. In this embodiment insertion can be completed when the tolerance ring 18 reaches its operative i.e. "in use" position with respect to the outer component 14, i.e. aligned therewith in this case. The alignment may be achieved by providing a stop, e.g. a surface below the outer component 14, against which the tolerance ring e.g. the bottom edge of tolerance ring abuts. After the tolerance ring 18 is aligned, the inner component 12 can be pushed axially relative to it and the outer component to complete the mating step and to transfer the tolerance ring 18 into its operative state, i.e. compress the projections 20 between the inner and outer components 12, 14 such that the tolerance ring can provide an interference fit therebetween.

FIG. 1C shows the completed mating step. The radial height of the projections 20 can be greater than the annular gap between the mounting portions 24 of the inner component 12 and the inward facing surface 15 of the outer components 14. The mounting portions 24 can therefore be arranged to align with the projections 20 on the tolerance ring 18 when the components are all aligned in use.

Compression of the projections may take place only during the final movement of the inner relative to the tolerance ring. Thus, substantial pressure (caused by the compression) between relatively moving walls of the inner and outer components may only occur for the short distance the inner component moves between the configurations illustrated in FIGS. 1B and 1C. In contrast, in conventional assembly methods this pressure can be present throughout the mating step.

Variations in the number and configuration of the projections are contemplated by the specification. The recessed portion can be arranged in accordance with different configurations to ensure that compression of the projections does not occur during insertion of the pre-assembly into the outer component.

Figure 2:
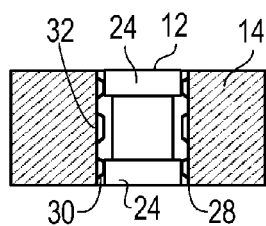
FIG. 2 is a cross-sectional view of a tolerance assembly similar to FIG. 1 but with an alternative tolerance ring configuration.

FIG. 2 shows an alternative tolerance ring configuration. In this embodiment the tolerance ring can have two axially spaced sets of projections 30 which are compressed in use between the mounting portions 24 of the inner component 12 and the outer component 14. In between the sets of projections 30 can be a center wave band 32 arranged to provide axial strength to the portion of the band in between the sets of projections 30. The center band 32 can project inwardly (i.e. in the same direction as the projections 30) but can have a smaller radial height so that it is not compressed during insertion of the pre-assembly.

Figure 3A:
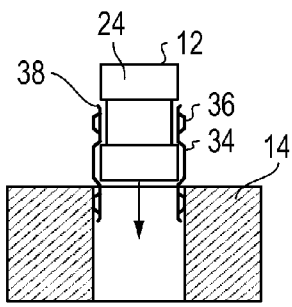
FIGS. 3A and 3B are cross-sectional views of another tolerance ring assembly at two stages during a mounting method that is an embodiment of the invention.
Figure 3B:
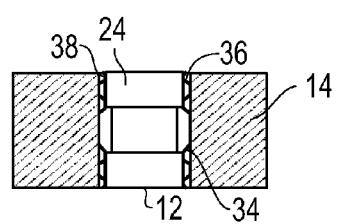

FIGS. 3A and 3B show steps of an assembly method and a mounting apparatus that are yet further embodiments of the invention. The inner and outer components 12, 14 can have the same configuration as in FIG. 1 and the assembly method can be the same. However, in FIG. 3 the tolerance ring 34 can have a different configuration. In this embodiment, all of the projections 36 can extend radially outwardly. This configuration may be preferred because the sliding interface in the final step (where compression of the projections takes place) does not include the projections themselves. In other words, the outward facing surface of the mounting portions 24 can contact the band of the tolerance ring 34 and not the peaks of the projections 36. This can be beneficial in terms of smoothing the compression of the waves and avoiding torque ripple if the inner component is a pivot, e.g. for a hard disk drive unit.

The band of the tolerance ring shown in FIG. 3A can have a variable diameter along its axis. Each set of projections 36 can be provided on a narrowed section, e.g. waist, of the tolerance ring. One of these narrowed sections can be received in the recessed portion when the tolerance ring 34 is mounted on the inner component 18 as the pre-assembly. The wider section between the waists can enclose one of the mounting portions in the pre-assembly. Thus, during insertion of the pre-assembly the projections 36 can be received in the channel formed by the recessed portion so that they are not compressed.

FIG. 3B shows the assembly apparatus after the inner component is fully mated with the outer component. The mounting portions 24 can compress the projections 36 against the outer component 14 by pushing outward the band at its waists.

The tolerance ring 34 in FIGS. 3A and 3B can also have a tapered axial edge 38 to promote axial alignment of the inner component with the tolerance ring 18 and smooth entry of the upper mounting portion into the waist region. The central wider section can also taper to the waist regions to provide a similar effect.

Figure 4A:
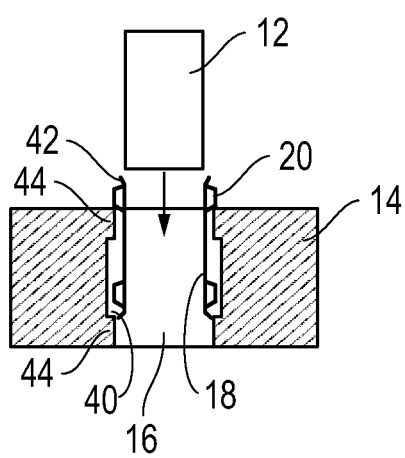
FIGS. 4A and 4B are cross-sectional views of yet another tolerance ring assembly at two stages during a mounting method that is an embodiment of the invention.
Figure 4B:
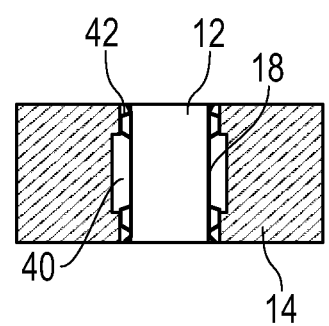

FIGS. 4A and 4B show yet another embodiment of an assembly method and a mounting apparatus. In this embodiment, the recessed channel 40 can be provided in the inwardly facing wall of the outer component. That wall thus effectively can have a stepped configuration comprising two narrower mounting portions 44 at the axial ends of the bore 16, which mounting portions 44 bound the wider channel 40.

The tolerance ring 18 can have outwardly facing projections 20. In this embodiment the tolerance ring 18 can be a split ring whose rest diameter is greater than the diameter of the mounting portions 44, whereby the pre-assembly can include the tolerance ring 18 mounted on the outer component 14 with one set of projections 20 received in the channel 40 and the other set lying outside the outer component 14 (i.e. the tolerance ring axially protrudes from the bore 16). The resilience of the tolerance ring 18 can retain the projections in the channel and thus can prevent it from dropping out of the bore.

FIG. 4A shows the initial mating step in which the inner component 12, which in this embodiment may be a shaft with uniform diameter, is inserted into the pre-assembly, i.e. is axially moved into the tolerance ring 18. In the pre-assembly the tolerance ring 18 can occupy its relaxed state whereby its inner diameter can be no smaller than the outer diameter of the inner component such that the inner component can be inserted without compressing the projections 20.

The final stage of assembly can include pushing the tolerance ring axially relative to the outer component 14 such that one set of the projections leaves the recessed channel 40 and the other set enter the bore to be compressed between the inner component 12 and the mounting portions 44. During the final stage, the tolerance ring 18 may be aligned with the inner component 12 so that there is no relative movement therebetween, i.e. the only sliding interface is between the tolerance ring and the outer component. FIG. 4B shows the final assembled arrangement.

Since compression of the projections is not present during the initial stage of mating the inner and outer components, particle generation may be minimized.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of assembling a tolerance ring between opposing surfaces of an inner component and an outer component to provide an interference fit therebetween, the inner and outer components being arranged to mate with one another, and the tolerance ring comprising an annular band of resilient material for engaging an opposing surface of one of the inner and outer components, the annular band having a plurality of deformable projections extending radially therefrom to engage the opposing surface of the other one of the inner and outer components, wherein the method comprises:

mounting the tolerance ring on one of the inner and outer components whereby the projections are received in a recessed portion on at least one of the inner and outer components to which the tolerance ring is mounted;
   partially mating the inner and outer components; and
   completing mating by causing relative movement between the tolerance ring and the recessed portion to cause the projections to leave the recessed portion and to be compressed between the mated inner and outer components.

2. The method of claim 1, wherein partially mating the inner and outer components includes moving the tolerance ring into its in use portion relative to the component without the recessed portion and completing mating includes moving the component with the recessed portion relative to the tolerance ring.

3. The method of claim 1, wherein the recessed portion is between about 90% to about 150% of the change in the radial extent of the projections when compressed.

4. A method of assembling a tolerance ring between opposing surfaces of an inner component and an outer component to provide an interference fit therebetween,
   the outer component including an upper surface and an opposing lower surface, and further including a generally cylindrical through hole extending from the upper surface to the lower surface, the through hole defining a first diameter,
   the inner component comprising an elongate, substantially cylindrical rod, and including an upper mounting portion and an opposing lower mounting portion formed at a distal end of the inner component, the lower mounting portion being disposed at a first axial distance from the upper mounting portion, the upper and lower mounting portions each defining a second diameter smaller than the first diameter, the inner component further including a radially recessed portion extending axially between the upper and lower mounting portions, the radially recessed portion defining a third diameter smaller than the second diameter,
   the tolerance ring comprising a cylindrical wall including an upper interference portion and an opposing lower interference portion disposed at a second axial distance from the upper interference portion, the second axial distance being substantially equal to the first axial distance of the inner component, the upper and lower interference portions each having a maximum outer diameter substantially equal to the first diameter, and a minimum inner diameter substantially equal to the second diameter, wherein the upper and lower interference portions comprise a plurality of inwardly facing projections extending from the cylindrical wall of the tolerance ring, the projections defining the minimum inner diameter of each of the respective upper and lower interference portions, wherein the method comprises:
   mounting the tolerance ring on the inner component whereby the projections are received in the radially recessed portion of the inner component to form a pre-assembly;
   inserting the pre-assembly into the outer component; and
   completing mating by moving the inner component relative to the tolerance ring and compressing the projections.

5. The method according to claim 4, wherein the tolerance ring further includes a center wave band between the upper and opposing lower interference portions.

6. A method of assembling a tolerance ring between opposing surfaces of an inner component and an outer component to provide an interference fit therebetween,
   the outer component including an upper surface and an opposing lower surface, and further including a generally cylindrical through hole extending from the upper surface to the lower surface, the through hole defining a first diameter,
   the inner component comprising an elongate, substantially cylindrical rod, and including an upper mounting portion and an opposing lower mounting portion formed at a distal end of the inner component, the lower mounting portion being disposed at a first axial distance from the upper mounting portion, the upper and lower mounting portions each defining a second diameter smaller than the first diameter, the inner component further including a radially recessed portion extending axially between the upper and lower mounting portions, the radially recessed portion defining a third diameter smaller than the second diameter,
   the tolerance ring comprising a cylindrical wall including an upper interference portion and an opposing lower interference portion disposed at a second axial distance from the upper interference portion, the second axial distance being substantially equal to the first axial distance of the inner component, the upper and lower interference portions each having a maximum outer diameter substantially equal to the first diameter, and a minimum inner diameter substantially less than the second diameter and more than the third diameter, wherein the upper and lower interference portions comprise a plurality of outwardly facing projections extending from the cylindrical wall of the tolerance ring, the projections defining the outer diameter of each of the respective upper and lower interference portions, the tolerance ring further includes a center wave band between the upper and opposing lower interference portions, wherein the method comprises:

mounting the tolerance ring on the inner component whereby the projections are received in the radially recessed portion of the inner component to form a pre-assembly;

inserting the pre-assembly into the outer component; and completing mating by moving the inner component relative to the tolerance ring and compressing the projections.

7. The method according to claim 6, wherein the tolerance ring further includes a tapered axial edge at the upper interference portion.

8. The method according to claim 7, wherein the tolerance ring further includes a tapered axial edge at the lower interference portion.

9. A method of assembling a tolerance ring between opposing surfaces of an inner component and an outer component to provide an interference fit therebetween, the outer component including an upper mounting portion and an opposing lower mounting portion, and further including a substantially cylindrical through hole extending from the upper mounting portion to the lower mounting portion, the upper and lower mounting portion defining a first diameter, the outer component further including a radially recessed portion extending axially between the upper and lower mounting portions, the radially recessed portion having a second diameter larger than the first diameter, the inner component comprising an elongate, generally cylindrical rod, defining a third diameter smaller than the first diameter, the tolerance ring comprising a cylindrical wall including an upper interference portion and an opposing lower interference portion disposed at a second axial distance from the upper interference portion, the second axial distance being substantially equal to the first axial distance of the inner component, the upper and lower interference portions each having a maximum outer diameter less than the second diameter, and a minimum inner diameter less than the third diameter, wherein the upper and lower interference portions comprise a plurality of outwardly facing projections extending from the cylindrical wall of the tolerance ring, the projections defining the outer diameter of each of the respective upper and lower interference portions, the tolerance ring further includes a tapered axial edge, wherein the method comprises:

mounting the tolerance ring on the outer component whereby the projections are received in the radially recessed portion of the inner component to form a pre-assembly;

inserting the inner component into the pre-assembly; and completing mating by moving the inner component relative to the tolerance ring and compressing the projections.

10. The method according to claim 9, wherein the tolerance ring further includes a tapered axial edge at the upper interference portion.

11. The method according to claim 10, wherein the tolerance ring further includes a tapered axial edge at the lower interference portion.

12. The method according to claim 1, wherein the inner component comprises:

a first mounting portion disposed at a first axial end of the recessed portion; and a second mounting portion disposed at a second axial end of the recessed portion.

13. The method according to claim 12, wherein the projections define radial peaks, and wherein the diameter of the radial peaks is less than a diameter of the first and second mounting portions prior to mating.

14. The method according to claim 13, wherein completing mating is performed such that the projections are aligned with the first and second mounting portions.

15. The method according to claim 1, wherein compression of the projections occurs only during the step of completing mating of the tolerance ring between the inner and outer components.

16. The method according to claim 1, wherein all of the plurality of deformable projections extend in a same radial direction.

17. The method according to claim 1, wherein the plurality of deformable projections includes two sets of circumferentially spaced apart projections.

18. The method according to claim 1, wherein the tolerance ring comprises an open loop.

19. The method according to claim 1, wherein the tolerance ring includes a tapered axial end.

20. The method according to claim 1, wherein the tolerance ring comprises spring steel.

* * * * *